(12) United States Patent
Desai et al.

(10) Patent No.: US 7,771,765 B2
(45) Date of Patent: Aug. 10, 2010

(54) TREATED SURFACES FOR HIGH SPEED DOUGH PROCESSING

(75) Inventors: Pravin Maganlal Desai, Carrollton, TX (US); Renu Mathew, Plano, TX (US); V. N. Mohan Rao, Plano, TX (US)

(73) Assignee: Frito-Lay North America, Inc., Plano, TX (US)

( * ) Notice: Subject to any disclaimer, the term of this patent is extended or adjusted under 35 U.S.C. 154(b) by 844 days.

(21) Appl. No.: 10/914,358

(22) Filed: Aug. 9, 2004

(65) Prior Publication Data

US 2006/0029700 A1    Feb. 9, 2006

(51) Int. Cl.
*A47J 36/02* (2006.01)
(52) U.S. Cl. ........................ 426/438; 426/496; 426/505; 99/404; 99/405
(58) Field of Classification Search ................. 426/438, 426/496, 505; 99/404, 405
See application file for complete search history.

(56) References Cited

U.S. PATENT DOCUMENTS

| | | | | |
|---|---|---|---|---|
| 1,982,186 | A | * | 11/1934 | Working ...................... 426/611 |
| 2,934,001 | A | * | 4/1960 | Cunningham et al. ......... 99/406 |
| 3,027,258 | A | * | 3/1962 | Markakis et al. ............ 426/540 |
| 3,132,949 | A | * | 5/1964 | Crowe ......................... 426/439 |
| 3,149,978 | A | * | 9/1964 | Anderson et al. ........... 426/439 |
| 3,248,229 | A | * | 4/1966 | Pader et al. .................... 426/98 |
| 3,576,647 | A | * | 4/1971 | Liepa .......................... 426/439 |
| 3,635,149 | A | * | 1/1972 | Smith et al. ................... 99/404 |
| 3,736,862 | A | * | 6/1973 | Crommelijnck .............. 99/353 |
| 4,166,139 | A | * | 8/1979 | Ishida ......................... 426/394 |
| 4,170,659 | A | * | 10/1979 | Totino et al. .................. 426/95 |
| 4,187,771 | A | * | 2/1980 | Westover et al. .............. 99/404 |
| 4,188,410 | A | | 2/1980 | Rispoli et al. |
| 4,234,612 | A | * | 11/1980 | Sakakibara et al. ......... 426/394 |
| 4,254,696 | A | * | 3/1981 | Ohtake ........................ 99/349 |
| 4,339,465 | A | | 7/1982 | Strouss |
| 4,547,388 | A | | 10/1985 | Strouss |
| 4,554,865 | A | * | 11/1985 | Caridis et al. ................. 99/353 |
| 4,560,569 | A | * | 12/1985 | Ivers ........................... 426/549 |
| 4,608,264 | A | * | 8/1986 | Fan et al. ..................... 426/438 |
| 4,650,687 | A | * | 3/1987 | Willard et al. ............... 426/438 |
| 4,770,891 | A | | 9/1988 | Willard |
| 4,889,733 | A | * | 12/1989 | Willard et al. ............... 426/438 |
| 5,260,078 | A | | 11/1993 | Spicer |
| 5,298,273 | A | | 3/1994 | Ito |
| 5,388,503 | A | | 2/1995 | Buerkle |
| 5,514,405 | A | | 5/1996 | Yokomichi |
| 5,770,254 | A | * | 6/1998 | Izzo et al. .................... 426/633 |

(Continued)

FOREIGN PATENT DOCUMENTS

JP        62-11066       1/1987

(Continued)

*Primary Examiner*—Drew E Becker
*Assistant Examiner*—Steven Leff
(74) *Attorney, Agent, or Firm*—Colin P. Cahoon; Celina M. Diaz; Carstens & Cahoon, LLP

(57) ABSTRACT

A novel method for controlling adhesion of food product to process surfaces by manipulating fryer oil composition and treating process surfaces. Adding various chemical species to fryer oil allows control of interfacial tension between food product and process surface. Process surfaces may be abraded to reduce surface area in contact with food product thereby reducing undesirable product adhesion.

20 Claims, 3 Drawing Sheets

U.S. PATENT DOCUMENTS

| | | | |
|---|---|---|---|
| 6,024,554 | A | 2/2000 | Lawrence |
| 6,129,939 | A * | 10/2000 | Fink et al. .................... 426/438 |
| 6,228,414 | B1 * | 5/2001 | Villagran et al. ............ 426/549 |
| 6,228,915 | B1 | 5/2001 | Lensvelt |
| 6,245,374 | B1 | 6/2001 | Thomas |
| 6,331,266 | B1 | 12/2001 | Powell |
| 6,350,594 | B1 | 2/2002 | Clarke |
| 6,386,094 | B1 | 5/2002 | Stevenson et al. |
| 6,412,397 | B1 * | 7/2002 | McNeel et al. ................. 99/330 |
| 6,433,053 | B1 | 8/2002 | Kasturi |
| 6,437,031 | B1 | 8/2002 | Lensvelt |
| 6,518,337 | B1 | 2/2003 | Baker |
| 6,586,029 | B1 | 7/2003 | Iverson |
| 6,613,376 | B2 | 9/2003 | Smith et al. |
| 6,875,458 | B2 * | 4/2005 | Dove et al. .................... 426/438 |
| 2002/0044996 | A1 * | 4/2002 | McNeel et al. .............. 426/549 |
| 2003/0031770 | A1 * | 2/2003 | Sada et al. ................... 426/438 |
| 2004/0139861 | A1 * | 7/2004 | Dove et al. .................... 99/404 |

FOREIGN PATENT DOCUMENTS

| | | |
|---|---|---|
| JP | 62-262954 | 11/1987 |
| JP | 04-341221 | 11/1992 |
| JP | 06121635 | 5/1994 |
| JP | 07-16052 | 1/1995 |
| JP | 08-66314 | 3/1996 |
| JP | 09-299034 | 11/1997 |
| JP | 2002-306141 | 10/2002 |
| JP | 2004-024116 | 1/2004 |
| WO | 90/08480 | 8/1990 |
| WO | WO-99/40826 | 8/1999 |
| WO | 03/022079 | 3/2003 |

\* cited by examiner

TREATED SURFACES FOR HIGH SPEED DOUGH PROCESSING

BACKGROUND

1. Technical Field

The present invention relates to a method for controlling adhesion of fried food products to process surfaces by using additives to control the interfacial tension of oil and by treating process surfaces contacting such food products. The treatment of surfaces relates to abrading, scoring or forming surfaces to reduce surface contact with dough and thereby reducing the interfacial tension between a surface and dough. The invention has particular application to cooking pre-formed dough snack pieces but can be applied to fried food products generally.

2. Description of Related Art

There are several types of prior art fryers typically used in the food industry for frying snack food products that require relatively even frying on all sides of the product. Generally, snack pieces, such as fabricated potato crisps, are formed from sheeting dough and cutting dough into discrete pieces (pre-forms) for treatment. Treatment involves cooking pre-forms in a fryer to produce cooked snack pieces. In general, these fryers cook product in a stream of hot oil.

In dough-sheeting operations, there are many process conditions that can affect the tendency of dough to stick to process surfaces (e.g. conveyor belts, molds and cooking surfaces). Of particular importance is interfacial tension between dough and process surfaces. Dough adheres to process surfaces as dough is cut, transported, and introduced into cooking oil. Excessive adhesion of dough can cause ineffective chip cutting, chip sticking, erratic behavior in a fryer, and under- or over-frying. Dough adhesion can be partly controlled by dough composition by the addition of emulsifiers such as lecithin with a particle size varying from 200 to 600 microns. However, dough composition cannot vary widely without drastically affecting the final product. Too much or too little adhesion can affect fried product taste, texture, appearance, quality variability, and control of package weight.

Control of dough adhesion is especially important as dough is introduced into cooking oil in fryers. Dough is initially denser than oil (oil having a lower specific gravity) when it is introduced to cooking oil on a conveyor. Ideally, as dough begins to cook, escaping gases cause the dough to release from conveyor or process surfaces. If the product is less dense than oil, buoyancy forces also exert an upward force that helps overcome adhesion forces. Adhesion forces keep dough attached to submerged conveyor surfaces.

However, buoyancy and other product-removing forces sometimes are not sufficient to overcome adhesion forces. Excessive adhesion leads to several undesirable results including dough residue buildup on conveyor surfaces, product of variable quality, wasted product, and process upsets. Excessive sticking or adhesion is a large source of inefficiency and waste during production. Excessive adhesion can even lead to a halt in production as equipment must be cleaned and re-initialized before production can continue.

In the current art, food processors rely on natural degradation of cooking oil in a fryer in order to ensure that food product fed to the fryer does not stick excessively to process surfaces such as conveyor belts. Some food products are cooked in fresh oil for 15 to 60 minutes before the cooking oil is in a condition such that the product does not stick excessively to cooking and conveying surfaces.

As one example, a prior art, single-mold form fryer for cooking snack products is shown in FIG. 1. A fryer assembly 100 receives uncooked snack pieces at an entrance area 102. After cooking, the snack products exit the fryer assembly 100 at an exit area 104.

Dough, formulated to produce the preferred snack pieces, is sheeted and formed into pre-forms before being cooked. In FIG. 1, the fryer assembly 100 processes pre-forms (not shown) through a form fryer with a top conveyor 120, a bottom entrance conveyor 130, and a bottom exit conveyor 140. The feeding segment is the top surface of the bottom entrance conveyor 130 between the input-side roller 132 and the submerged roller 134. The path of the bottom entrance conveyor 130 winds about several rollers 132, 134, 136, 138. After the bottom entrance conveyor 130 contacts the oil 152 in an entrance area 102, the snack pieces begin to fry.

Some degree of adhesion between a snack piece and conveyor surfaces 120, 130, 140 is necessary. Otherwise, dough pre-forms would slide uncontrollably along the downwardly-angled entrance conveyor 130 into the cooking oil 152. There must be adequate adhesion in order to prevent such sliding of pre-forms.

Contrarily, there should not be excessive adhesion. Consider, for example, the introduction of pre-forms into a single-mold form fryer as shown in FIG. 1. Ordinarily, upward forces due to cooking cause the pre-forms to separate from the bottom entrance conveyor 130, rise upwards, and contact the top conveyor 120 within a few seconds. Once the pre-forms contact the top conveyor 120, the bottom entrance conveyor 130 is no longer needed for the cooking of pre-forms. The bottom entrance conveyor 130 then passes by a peel plate or pan extension 158 before the bottom entrance conveyor 130 rotates about a submerged roller 134 and begins its return path to receive new pre-forms at the entrance area 102.

One purpose of a peel plate or pan extension 158 is to ensure that the flow of oil over the transition is as gentle as possible avoiding damage to dough product as it is transported toward the center of the fryer and exit conveyor 140. The gap between the peel plate 158 and bottom entrance conveyor 130 is prone to jamming if product fails to separate from the bottom entrance conveyor 130 before reaching the peel plate 158. Any gap between a moving process surface and another process surface may potentially cause a process upset if product fails to release from the surface to which it is attached or mated. Such process upsets are to be avoided.

Pre-form material is more likely to excessively adhere to a hot surface, such as a bottom entrance conveyor 130, if the surface is at a higher temperature than the pre-form. Contact with such hot surface is to be avoided even for a few seconds especially if the surface has not been coated with oil. If an excessive amount of pre-form material fails to disengage from the bottom entrance conveyor 130, the pre-form material may create a blockage at the peel plate or pan extension 158 and cause the process to halt as the non-released pre-forms prevent food product from reaching the exit conveyor 140.

In a typical fryer, the turn-over time of frying oil may be several hours depending on the quantity of product actually fried. The turn-over time is the amount of time it takes for an equivalent volume of cooking oil in the fryer to be replaced due to the loss of oil. The loss of oil is due in part to the oil adhering to, or being absorbed by, the food product. Fresh cooking oil must be added continuously or periodically to the fryer to replace lost oil. However, as disclosed herein, the use of fresh oil actually increases the likelihood that pre-forms do not release from the bottom entrance conveyor 130. The inventors have discovered that this phenomenon is due to a dramatic difference in the interfacial tension between fresh cooking oil and used cooking oil.

Consequently, a need exists to control the adhesion of dough pre-forms to facilitate the release of pre-forms into fryer oil. A need exists for a method to transport and process dough product wherein the product does not excessively stick or adhere to process surfaces. More specifically, a need exists for a system that allows dough product to be handled, transported and processed wherein interfacial adhesion of product to a surface is controlled to a desired level. Such a system is especially needed during startup of a dough fryer when interfacial adhesion is highest because of the presence of fresh cooking oil.

SUMMARY OF THE INVENTION

The proposed invention comprises a system to control interfacial tension between a food product and a process surface. The proposed invention comprises adjustments to the composition of oil used to process food product in combination with treatment of surfaces contacting the food product. The desired amount of interfacial tension is obtained by manipulating one or more of the following: the composition of oil, the composition of food product, the amount of surface area in contact with the food product, or any combination of these elements. The above as well as additional features and advantages of the present invention will become apparent in the following written detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

REFERENCE NUMERALS

Figure 1:
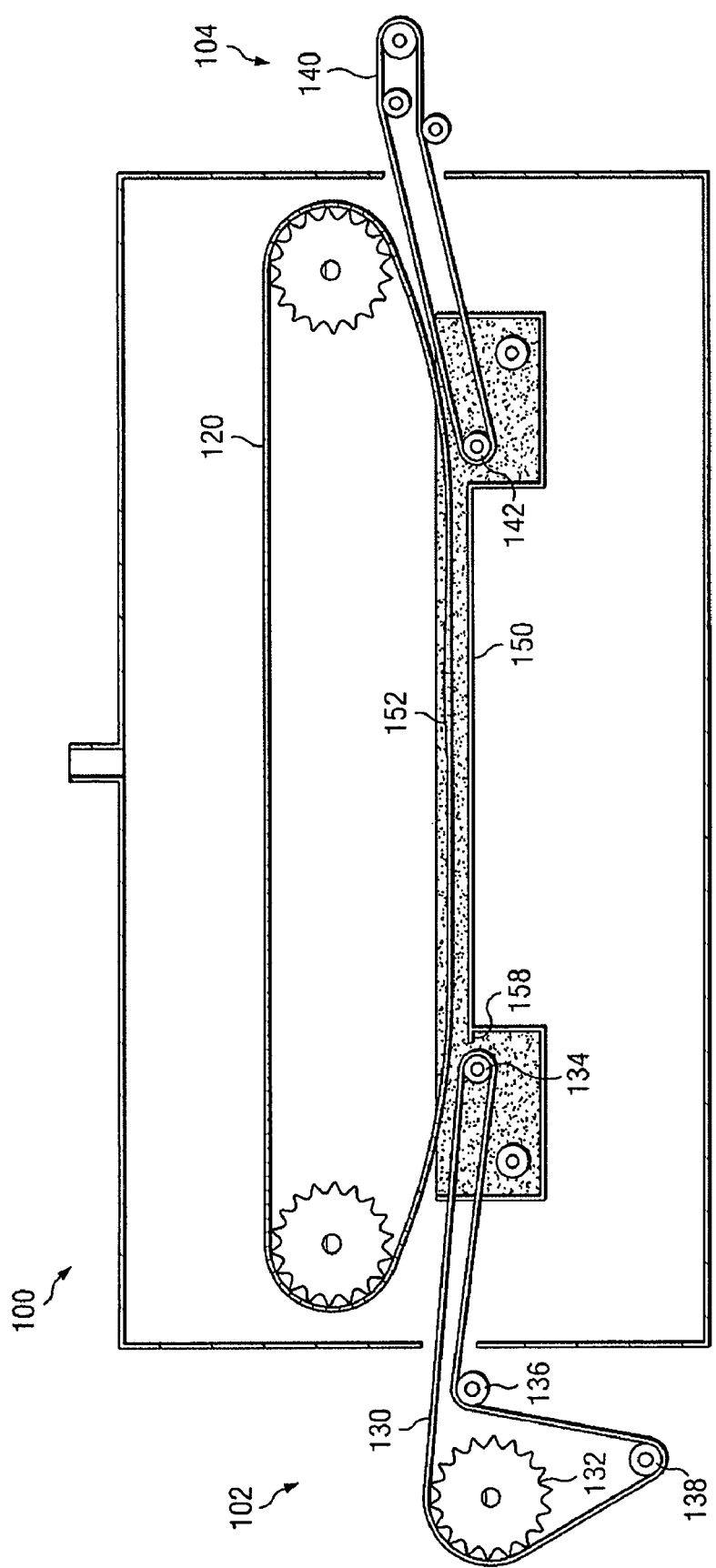
FIG. 1 is a drawing of a single mold form fryer known in the prior art.

100 fryer assembly
102 entrance area
104 exit area
120 top conveyor
130 bottom entrance conveyor
140 bottom exit conveyor
132 input-side roller
134 submerged roller
136, 138 roller
152 oil
158 peel plate or pan extension
30 scoring or groove
402, 406 viscosity values for used oil
404, 408 viscosity values for fresh oil

DETAILED DESCRIPTION

While the invention is described below with respect to preferred embodiments, other embodiments are possible. The concepts disclosed herein apply to any system in which the cooking oil provides an undesirably high level of interfacial tension between process surfaces and a food product. Snack piece dough is used to describe the invention but is merely exemplary of many other food products that may be so processed according to embodiments of the invention.

In a fryer, the concepts include the addition of particles or liquids that form a mixture with oil. The concepts also include the addition of liquids to oil, including emulsifiers, which form a solution with the oil.

The oil relevant to the adhesion of a food product to a surface is that oil existing between the food product and the product-receiving surface. The concepts in the invention also relate to modifying the product-receiving surface contacting or mated to the food product in order to control adhesion of the food product to said surface.

Furthermore, the invention is not limited to the use of materials listed herein as oil additives such as emulsifiers and surface-active agents ("surfactants"). Other similar materials can be used to control or influence the overall interfacial tension of cooking oil between a product and process surface. In the illustrated embodiments, the various objects and layers are drawn at a scale suitable for illustration rather than at the scale of the actual material. The terms "adhesion" and "interfacial tension" are used somewhat interchangeably in this application, and both terms describe the force required to separate two surfaces having a thin layer of fluid sandwiched there between.

Frying Food Products

In a typical oil fryer, fried food products are cooked and subsequently processed before being consumed. By way of illustration and not limitation, fried food products may be any one of fish, chicken, crackers, donuts, or snack piece dough.

In an oil fryer, a pre-form dough piece initially sinks in oil but then gradually begins to become more buoyant as water in the dough escapes during cooking. Typically, the specific gravity of a pre-form gradually decreases as steam escapes during cooking. A typical dough has an initial specific gravity of about 1.0 before being cooked. Frying oil (or cooking oil) typically has a specific gravity of approximately 0.8 at 350 F. In a preferred embodiment, a finished food product such as a potato chip or pre-form typically has a specific gravity less than 0.8, which allows the food product to float in the oil and facilitates the removal of the same from the oil in preparation for packaging. In other embodiments, however, the fried product may or may not float in the oil depending on the relative specific gravities of the product and the cooking oil.

There is a significant difference between cooking with fresh oil and used oil in terms of adhesion of a food product to a product-receiving surface. For example, dough pieces fried in fresh cooking oil have a tendency to continue to stick to process surfaces longer than desired. Some properties of used and fresh oil are similar and do not explain the superior performance of used oil over fresh oil to fry food products. However, as explained below, used oil has some properties superior to fresh oil in terms of controlling adhesion of dough to process surfaces.

Surface Tension

Surface tension is caused by the attraction between molecules of a liquid. In the bulk of a liquid, each molecule is pulled equally in all directions by neighboring molecules, resulting in no net force in any direction. Molecules at a surface of a liquid are pulled inwards by other molecules deeper inside the liquid and do not have other liquid molecules on the outside to balance these forces. There may be a small outward attraction caused by air molecules, but air is much less dense than the liquid, so this force is negligible. The result is a net inward force on surface molecules of a liquid.

Surface tension is defined as the force along a line of unit length perpendicular to the surface. Dimensional analysis shows that the units of surface tension in newtons per meter (N/m) are equivalent to joules per square meter ($J/m^2$), thus surface tension can also be considered as surface energy.

Table 1 shows the surface tension measured in units of mN/m for old and fresh oil at three temperatures. These results are expected and are consistent with known scientific principles. Since there is no difference in the measured values of surface tension between fresh and used oil, surface tension does not explain why dough pre-forms stick to conveyor belts and other product-receiving surfaces.

TABLE 1

Surface Tension

| Temperature | Fresh Oil (mN/m) | Used Oil (mN/m) |
| --- | --- | --- |
| 21° C. (Room Temperature) | 33.25 ± 0.10 | 33.07 ± 0.16 |
| 58° C. | 28.98 ± 0.27 | 31.71 ± 0.17 |
| 73° C. | 29.00 ± 0.24 | 28.68 ± 0.29 |

Viscosity

Figure 4:
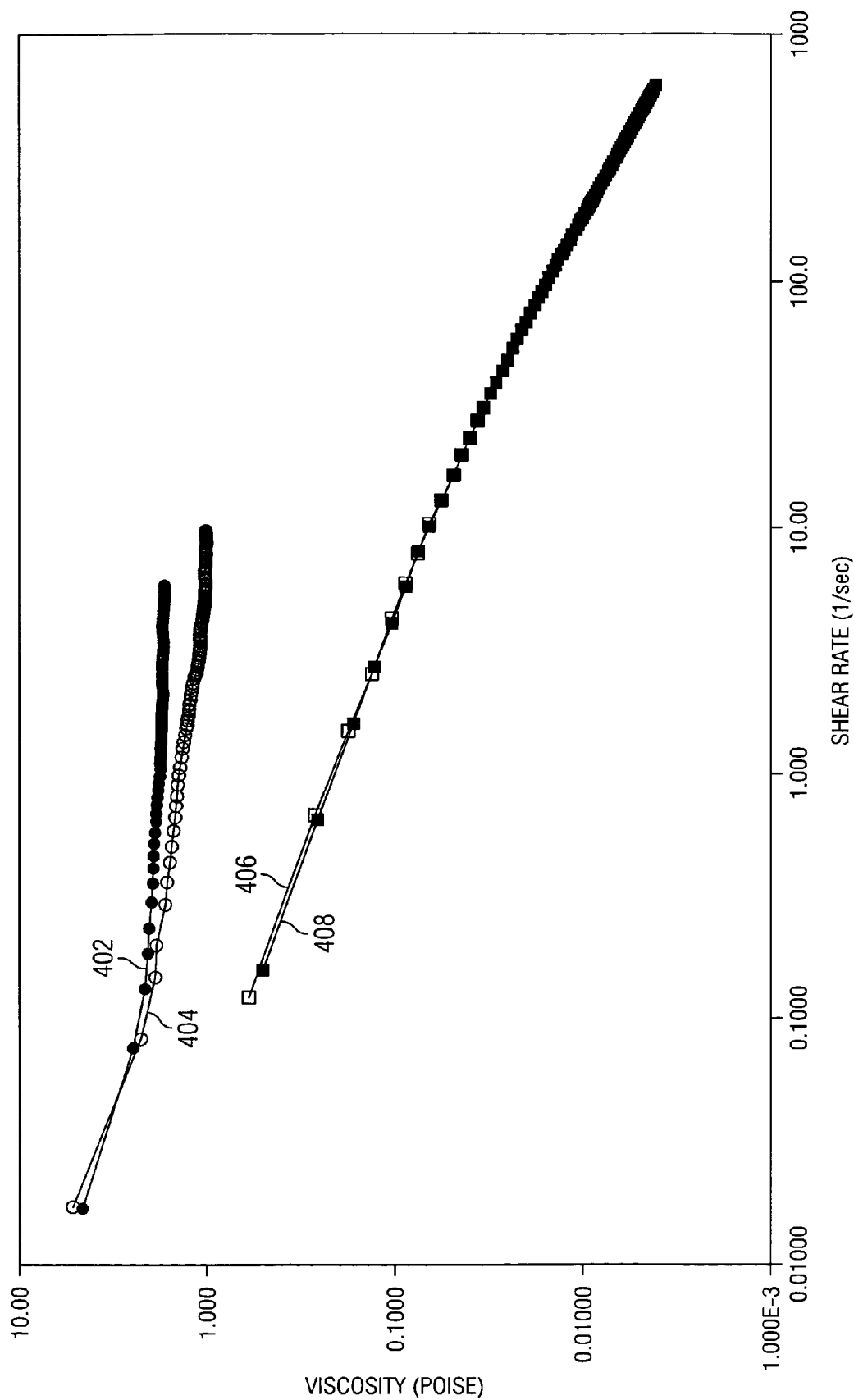
FIG. 4 is a plot of viscosity at various values of shear rate for used and fresh oil at 70 degrees F. (room temperature) and 194 degrees F.

Viscosity is a property of a fluid that is characterized by the internal resistance to flow. In a search to distinguish fresh oil from used oil, viscosity was measured at various values of shear rate. FIG. 4 is a plot of viscosity at various values of shear rate for used and fresh oil at 70 degrees F. (room temperature) and 194 degrees F. At room temperature there is a slight difference between viscosity values for used oil 402 and fresh oil 404 especially at higher values of shear rate. At these higher values of shear rate, used oil 402 has higher values of viscosity than fresh oil 404.

However, with reference to FIG. 4, at a frying temperature, 194 degrees F., the values of viscosity for used oil 406 do not vary from those values for fresh oil 408 even at high values of shear rate. Thus, viscosity does not explain the difference in frying performance between used and fresh oil in a fryer.

Interfacial Tension

By scientific definition, interfacial tension is a measure of surface tension at the boundary of two liquids. However, interfacial tension is used herein to describe a force necessary to separate a food product from a process surface. The term interfacial tension is one measurement even though there are two solid-liquid interfaces at the boundary of a dough preform and a process surface coated with oil (dough-to-oil, and surface-to-oil). These two interfaces theoretically have independent values of interfacial tension. The measurement of interfacial tension is the force required to separate the solid-liquid interface having the lower interfacial tension. The interface with the higher value remains intact and the two materials forming this interface are not forced apart.

In another embodiment, interfacial tension can be defined as the force required to separate a 4.5 inch diameter smooth stainless steel plate coated with a film of oil from dough pre-forms using an Instron Universal Testing Machine from Instron Corporation. Fresh oil is cooking oil that has not previously been used to cook a food product. Old oil is cooking oil that has been used to cook a food product, such as potato chips, and consequently contains cooking byproducts and such oil is degraded through reaction with oxygen and other chemical species.

In one measurement, fresh oil had an interfacial tension of about 769 dyne per square centimeter while two-hour old cooking oil had an interfacial tension of about 288 dyne per square centimeter. This difference is dramatic given that the old oil has only been used to cook a food product for two hours. Oil upon usage at elevated temperatures generates polar compounds that reduce the interfacial tension between the oil on a food processing surface and moisture on the surface of foods such as dough pre-forms.

In another series of measurements, Table 2 shows the interfacial tension in units of mN/m for old and fresh oil at three temperatures. The measurements were made using a DuNouy Tensionmeter 70545 (CSC Scientific Company, Inc.).

At all three temperatures in Table 2, it is remarkable to observe that fresh oil has about the same value for surface tension. Contrariwise, used oil has increasingly lower values of interfacial tension as the temperature is raised. The significant difference between the values of interfacial tension of fresh and used cooking oil helps explain why used oil may be more preferable than new oil to cook pre-forms and other food products. Fresh cooking oil exhibits traits of used cooking oil after fresh cooking oil has been used to continuously cook food product for about 30 minutes depending on the size of the fryer and the amount of food product cooked per unit of oil.

TABLE 2

Interfacial Tension

| Temperature | Fresh Oil (mN/m) | Used Oil (mN/m) |
| --- | --- | --- |
| 21 deg C. (Room Temperature) | 22.41 ± 0.12 | 16.66 ± 0.21 |
| 58 deg C. | 23.57 ± 0.18 | 14.01 ± 0.42 |
| 73 deg C. | 23.49 ± 0.22 | 9.63 ± 0.17 |

Additives

In one embodiment of the invention, additives are introduced into fresh cooking oil to lower the interfacial tension of the resulting mixture or solution. Additives may include solid particles that are small enough to be suspended in oil. Such additives may include lecithin and comestible emulsifiers.

Additives may also include surfactants and emulsifying agents. Such additives may end up forming an emulsion of oil and water-soluble compounds released from cooking food product. Or, such compounds may end up forming a solution with the oil. Such additives may include one or more of the following compounds: monoglycerides, diglycerides, tocopherol, lecithin, sodium corboxymethylcellulose (CMC), cholesterol, carageenin, lanolin, gum arabic, gum tragacanth, gum karaya, guar gum, palmitic acid, stearic acid, oleic acid, linoleic acid, arachidonic acid, sorbitan monstearate, sorbitan trioleate, propylene glycol monostearate, decaglycerol decaoleate, and any member of the family of compounds known as propolyne glycol monoesters with an HLB (hydrophilic lipophilic balance) value less than 5 glycerol monostearate. Additives may also include compounds derived naturally from frying a food product.

Process Surfaces

In addition to oil composition, another process condition which affects interfacial tension is the physical nature of the product-receiving surface. The composition and texture of a process surface contacting a food product influence how much force is required to separate the food product from the process surface. Traditionally, a process surface is a smooth metal surface. According to the invention, modifications to the composition or texture of a product-receiving surface can produce significant benefits in reducing interfacial tension and adhesion of food product.

Figure 2A:
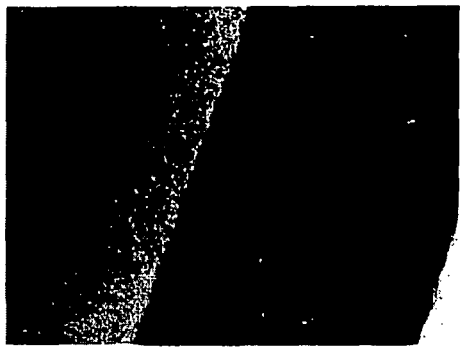
FIGS. 2a, 2b and 2c are magnified images of a metal process surface showing an untreated, relatively smooth surface.
Figure 2B:
Figure 2C:

FIGS. 2a, 2b, and 2c are three micrographs of a typical metal surface at a magnification of 60. These micrographs show that the surface has some texture and is not completely smooth as appears to the naked eye. Despite the visible presence of texture or grooves in a typical smooth, metal product-receiving surface, these features alone may not be sufficient to provide a reduction in interfacial tension and adhesion of food product.

In a preferred embodiment, a stainless steel chain mesh conveyor is sandblasted prior to use with a fryer. When in use, the chain mesh conveyor introduces dough pre-forms into hot frying oil in a continuous fryer. Gases evolved during frying cause the pre-forms to separate from the chain mesh food conveyor before it makes its return path to receive more pieces.

It is desirable to control the interfacial tension of cooking oil, whether fresh or used, at values comparable to those measured for used cooking oil. Controlling the interfacial tension of oil by modifying the product-receiving surface by sandblasting the surface, excessive adhesion of food products is avoided, less food product is wasted and fewer process upsets are the result.

Figure 3A:
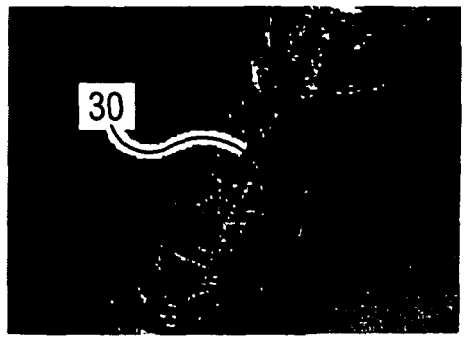
FIGS. 3a, 3b and 3c are magnified images of an abraded metal process surface showing uneven surface features.
Figure 3B:
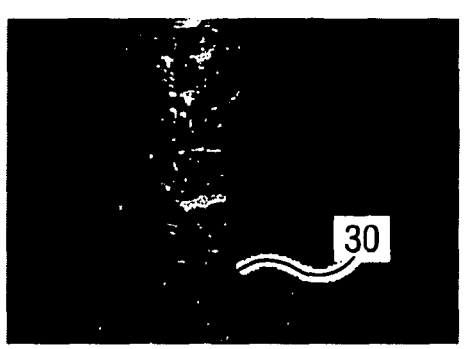
Figure 3C:

Generally, in one embodiment of the invention, a traditional metal surface for contacting a food product, such as a fryer belt, is abraded causing scoring or irregular grooves or pits in the surface. In one embodiment, the surface is sandblasted to cause abrading. FIGS. 3a, 3b, and 3c are three micrographs at a magnification of 60.times. of a typical metal surface after the surface has been abraded. The scoring or grooves 30 in FIGS. 3a and 3b reduce the over all surface area of metal in contact with the food product. The scoring reduces the interfacial tension between a food product and metal surface. Abrading may include any method to roughen or give texture to a product-receiving surface that either increases or decreases product adhesion.

In another embodiment, the surface is shaped, formed, prefabricated or molded to form scoring, ridges, grooves, depressions, or texture in order to reduce the actual surface area available for contact with a product of a given size. Through the treatment of the surface, the interfacial tension between the food product and the surface is reduced or controlled to a desired level.

In another embodiment, the process surface is formed from non-traditional materials such as ceramic, Teflon®, plastic or other material. Such selection of the composition of a material allows for the control of interfacial tension to a desired level for a given combination of a cooking oil and a food product.

Surface Treatment Combined with Oil Additives

In another embodiment, the modification of a process surface and the modification to the composition of cooking oil, both described above, are combined to adjust the interfacial tension and product adhesion between a food product and a process surface. For example, in a preferred embodiment, the process surfaces that contact both product and oil are sandblasted to roughly abrade the surface. In particular, the fryer feed conveyor is sandblasted prior to use. Next, one or more additives are combined with cooking oil to be used in the fryer. Such additives include, but are not limited to sorbitan trioleate, propylene glycol monostearate, glycerol monostearate, distilled monoglycerides, and polyglycerols. When dough pieces, transported upon the abraded feed conveyor, are introduced into the cooking oil, the oil additives and abraded surfaces provide a means to introduce pre-forms into cooking oil with a desired amount of adhesion.

In this invention, the adjustment of interfacial tension is made such that a desired amount of adhesion exists between a food product and any process surface. The desired amount of adhesion would be sufficient to prevent the food product from sliding on an incline while simultaneously preventing excessive adhesion, which excessive adhesion would prevent the food product from releasing into fryer oil.

While the invention has been particularly shown and described with reference to a preferred embodiment, it will be understood by those skilled in the art that various changes in form and detail may be made therein without departing from the spirit and scope of the invention.

We claim:

1. A method for assisting a dough product to release from a metal product-receiving surface of a feeding segment of a bottom entrance conveyor in a single mold form fryer containing a frying oil, wherein said product-receiving surface is partially submerged in said frying oil and positioned below a top conveyor belt of said single mold form fryer, said method including the steps of:
   a) introducing said dough product into said form fryer containing said frying oil on said metal product-receiving surface of said feeding segment on said bottom entrance conveyor such that the product is mated with the metal product-receiving surface as said product is introduced into said frying oil, wherein said product is submerged in said frying oil prior to contact with said top conveyor belt of said form fryer;
   b) frying said dough product in said frying oil, wherein said product rises upwards as it is released from said product-receiving surface of said feeding segment and is fried beneath said top conveyor belt of said single mold form fryer, thereby producing a form-fried, molded product; and
   c) removing said form-fried, molded product from said frying oil on a bottom exit conveyor;
   wherein said method further comprises the step of reducing the interfacial tension forces between the dough product and the product-receiving surface, said reducing step being performed prior to the introducing of step a); and further wherein said step of reducing interfacial tension comprises physically limiting the amount of surface area of the product-receiving surface available for mating with said dough product, such that the area of contact between said product-receiving surface of said feeding segment and the mating surfaces of said product is less than the total area available on the mating surfaces of said product.

2. The method of claim 1, wherein the step of reducing the interfacial tension forces comprises abrading said product-receiving surface of said feeding segment.

3. The method of claim 1, wherein the step of reducing the interfacial tension comprises roughening said product-receiving surface of said feeding segment.

4. The method of claim 1, wherein the step of reducing the interfacial tension comprises the addition of particles made of lecithin to said fryer oil.

5. The method of claim 1, wherein the step of reducing the interfacial tension comprises the addition of particles made of lecithin to said product prior to the introducing of said product in step a).

6. The method of claim 1, wherein the step of reducing the interfacial tension comprises adding sorbitan monostearate to said frying oil.

7. The method of claim 1 wherein the step of reducing the inner facial tension comprises adding sorbitan trioleate to said frying oil.

8. The method of claim 1 wherein the step of reducing the inner facial tension comprises adding decaglycerol decaoleate to said frying oil.

9. The method of claim 1, wherein the step of reducing the inner facial tension comprises adding any member of the family of compounds known as propylene glycol mono esters with an HLB (hydrophilic lipophilic balance) value less than 5 to said frying oil.

10. The method of claim 1, wherein the step of reducing the inner facial tension comprises adding propylene glycol monosterate to said frying oil.

11. The method of claim 1 wherein the step of reducing the inner facial tension comprises adding distilled monoglycerides to said frying oil.

12. The method of claim 1, wherein the step of reducing the inner facial tension comprises adding polyglycerols to said frying oil.

13. The method of claim 1, wherein the step of reducing the inner facial tension comprises adding monoglycerides to said frying oil.

14. The method of claim 1 wherein the step of reducing the inner facial tension comprises adding tocopherol to said frying oil.

15. The method of claim 1, wherein the step of reducing the inner facial tension comprises adding sodium carboxymethyl-cellulose to said frying oil.

16. The method of claim 1, wherein the step of reducing the inner facial tension comprises adding cholesterol to said frying oil.

17. The method of claim 1, wherein the step of reducing the inner facial tension comprises adding lanolin to said frying oil.

18. The method of claim 1, wherein the step of reducing the inner facial tension comprises one or more additives to said frying oil selected from tarageenin, gum arabic, gum tragacanth, gum karaya, and guar gum.

19. The method of claim 1, wherein the step of reducing the inner facial tension comprises one or more additives to said flying oil selected from palmitic acid, stearic acid, oleic acid, linoleic acid, and arachidonic acid.

20. The method of claim 1, wherein said product-receiving surface comprises uneven surface features.

* * * * *